(12) United States Patent
Yu et al.

(10) Patent No.: US 10,884,120 B2
(45) Date of Patent: Jan. 5, 2021

(54) VEHICULAR RADAR DEVICE

(71) Applicant: CUB ELECPARTS INC., Fuxing Township, Changhua County (TW)

(72) Inventors: San-Chuan Yu, Fuxing Township, Changhua County (TW); Yu-Shun Lin, Fuxing Township, Changhua County (TW); Hsi-Hsun Chen, Fuxing Township, Changhua County (TW); Shui-Peng Yang, Fuxing Township, Changhua County (TW)

(73) Assignee: CUB ELECPARTS INC., Changhua County (TW)

(*) Notice: Subject to any disclaimer, the term of this patent is extended or adjusted under 35 U.S.C. 154(b) by 220 days.

(21) Appl. No.: 16/103,556

(22) Filed: Aug. 14, 2018

(65) Prior Publication Data
US 2020/0011990 A1 Jan. 9, 2020

(30) Foreign Application Priority Data
Jul. 6, 2018 (TW) .............................. 107123578 A

(51) Int. Cl.
*G01S 13/931* (2020.01)
*H01Q 1/02* (2006.01)
(Continued)

(52) U.S. Cl.
CPC ............ *G01S 13/931* (2013.01); *H01Q 1/02* (2013.01); *H01Q 1/3233* (2013.01); *H01Q 1/3283* (2013.01); *G01S 2007/027* (2013.01)

(58) Field of Classification Search
CPC ............. G01S 13/931; G01S 2007/027; G01S 2013/93271; G01S 2013/93275; H01Q 1/02; H01Q 1/3233; H01Q 1/3283
(Continued)

(56) References Cited

U.S. PATENT DOCUMENTS 4,346,774 A * 8/1982 Hirota .................. B60R 16/0237
180/167
6,788,190 B2 * 9/2004 Bishop .................... B60Q 9/006
340/435
(Continued)

FOREIGN PATENT DOCUMENTS

CN 207181667 U * 4/2018
CN 207181667 U 4/2018
(Continued)

*Primary Examiner* — Peter M Bythrow
*Assistant Examiner* — Nuzhat Pervin
(74) *Attorney, Agent, or Firm* — Muncy, Geissler, Olds & Lowe, P.C.

(57) ABSTRACT

A vehicular radar device includes a radar module and a dustproofing element. The radar module has a casing and a radar sensor disposed in the casing. The casing has a first outer wall surface and a second outer wall surface opposing the first outer wall surface. The first outer wall surface faces an inner wall surface of a bumper. An emission surface of the radar sensor faces the first outer wall surface of the casing. The dustproofing element has two opposing dustproofing surfaces. The two dustproofing surfaces attach to the first outer wall surface of the casing of the radar module and the inner wall surface of the bumper, respectively. Therefore, the vehicular radar device effectively precludes influences of ambient dust on performance of the radar sensor, so as to enhance sensing sensitivity of the radar sensor and extend its service life.

19 Claims, 5 Drawing Sheets

(51) Int. Cl.
*H01Q 1/32* (2006.01)
*G01S 7/02* (2006.01)

(58) Field of Classification Search
USPC .......................................................... 342/70
See application file for complete search history.

(56) References Cited

U.S. PATENT DOCUMENTS

| | | | | |
|---|---|---|---|---|
| 7,446,650 B2* | 11/2008 | Scholfield | ................ | B60R 1/06 340/438 |
| 7,724,180 B2* | 5/2010 | Yonak | .................... | H01Q 15/10 342/70 |
| 8,823,582 B2* | 9/2014 | Himmelstoss | ........... | H01Q 1/42 342/128 |
| 8,833,815 B2* | 9/2014 | Aleem | .................... | B60R 19/02 293/102 |
| 8,874,324 B2* | 10/2014 | Eggers | ................... | B60R 13/07 701/49 |
| 9,340,231 B1* | 5/2016 | Minahan | ................... | F16F 7/12 |
| 9,761,933 B2* | 9/2017 | Tagi | ....................... | G01S 13/931 |
| 9,855,914 B1* | 1/2018 | Hammer | ............... | B60W 30/08 |
| 9,956,993 B1* | 5/2018 | Klop | ..................... | G01S 13/931 |
| 10,012,720 B2* | 7/2018 | Emanuelsson | ......... | H01Q 1/528 |
| 10,073,163 B2* | 9/2018 | Philipp | ................. | G01S 13/931 |
| 10,367,258 B2* | 7/2019 | Tagi | ....................... | H01Q 15/02 |
| 10,620,308 B2* | 4/2020 | Breuer | ................... | G01S 13/867 |
| 2016/0231417 A1* | 8/2016 | Aoki | ..................... | G01S 7/032 |
| 2016/0370456 A1* | 12/2016 | Emanuelsson | ......... | G01S 7/032 |
| 2017/0222311 A1* | 8/2017 | Hess | ........................ | G01S 7/02 |

FOREIGN PATENT DOCUMENTS

| | | | | |
|---|---|---|---|---|
| DE | 102015210464 A1 | * | 12/2016 | |
| EP | 3107151 A1 | * | 12/2016 | |
| JP | 2003054339 A | * | 2/2003 | ............... G01S 7/03 |
| JP | 2005037139 A | * | 2/2005 | |
| JP | 2015140029 A | * | 8/2015 | ............ B60R 19/18 |
| WO | WO-2015090656 A1 | * | 6/2015 | |

* cited by examiner

VEHICULAR RADAR DEVICE

BACKGROUND OF THE INVENTION

1. Technical Field

The present disclosure relates to vehicular radars and, more particularly, to a vehicular radar device capable of enhanced dustproofing.

2. Description of Related Art

A conventional vehicular radar is typically mounted on an inner wall surface of a bumper of a vehicle. After long use, ambient dust readily accumulates in gaps between the bumper and the vehicular body and thus attaches to the surface of the radar's casing. The dust usually contains metallic impurities; as a result, the dust not only interferes with transmission and reception of radar waves but also leads to unexpected scattering and thus generation of noise. For these reasons, radar operability and performance inevitable deteriorates with time.

BRIEF SUMMARY OF THE INVENTION

It is an objective of the present disclosure to provide a vehicular radar device capable of enhanced dustproofing so as to enhance sensing sensitivity and extend its service life.

In order to achieve the above and other objectives, a vehicular radar device of the present disclosure comprises a radar module and a non-metallic dustproofing element. The radar module has a casing and a radar sensor. The casing has a first outer wall surface and a second outer wall surface opposing the first outer wall surface. The first outer wall surface of the casing faces an inner wall surface of a bumper. The radar sensor is disposed in the casing and has an emission surface. The emission surface of the radar sensor faces the first outer wall surface of the casing. The non-metallic dustproofing element is made of a material, such as polyurethane, silicone, foam, epoxy and thermoplastic elastomer (TPE). The dustproofing element has a first dustproofing surface and a second dustproofing surface. The first dustproofing surface of the dustproofing element attaches to the first outer wall surface of the casing of the radar module. The second dustproofing surface of the dustproofing element attaches to the inner wall surface of the bumper. The first dustproofing surface of the dustproofing element covers the first outer wall surface of the casing of the radar module completely or partially.

Therefore, the vehicular radar device of the present disclosure is advantageous in that the dustproofing elements effectively prevent ambient dust from attaching to the first outer wall surfaces of the casing of the radar module. Hence, a sensing signal generated from the radar sensor is not subjected to interference while penetrating the first outer wall surfaces of the casings, so as to enhance sensing sensitivity of the radar module and extend the service life of the radar module.

Fine structures, features, assembly and use of the vehicular radar device provided by the present disclosure are hereunder illustrated by embodiments and described in detail. However, persons skilled in the art understand that the detailed descriptions and specific embodiments put forth to implement the present disclosure are illustrative of the present disclosure rather than restrictive of the claims of the present disclosure.

DETAILED DESCRIPTION OF THE PREFERRED EMBODIMENTS

Figure 1:
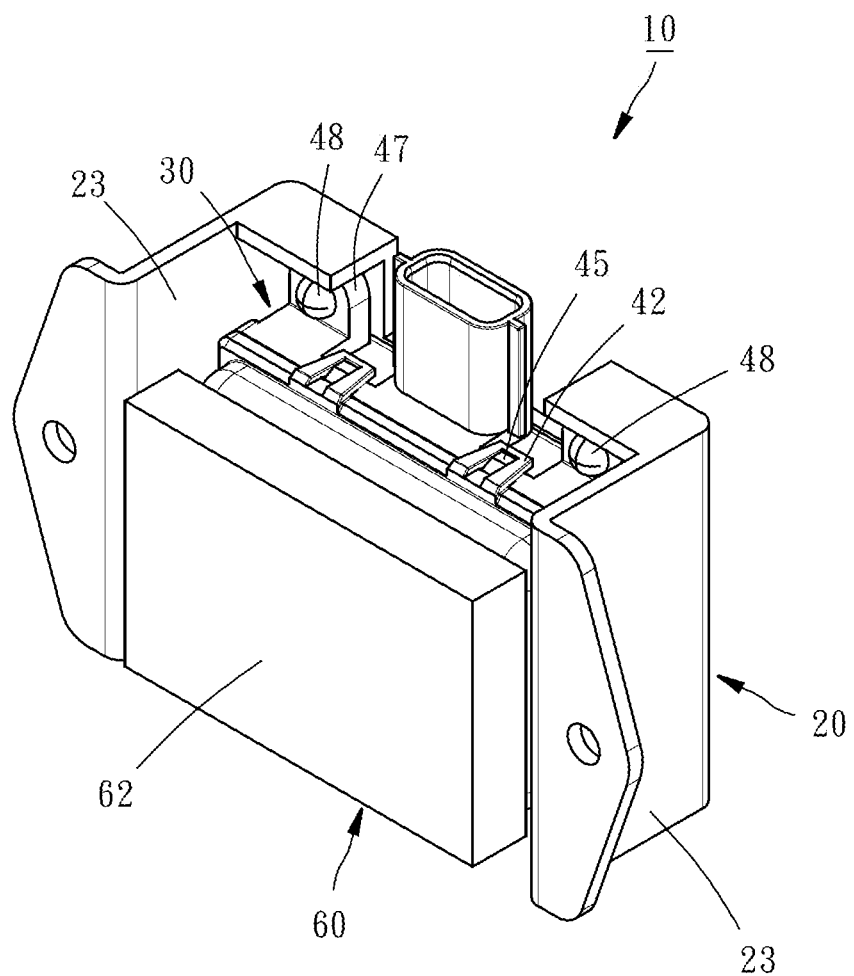
FIG. 1 is a perspective view of a vehicular radar device according to the first embodiment of the present disclosure.

In embodiments and drawings below, identical reference numerals denote identical or similar components or structural features thereof.

Figure 2:
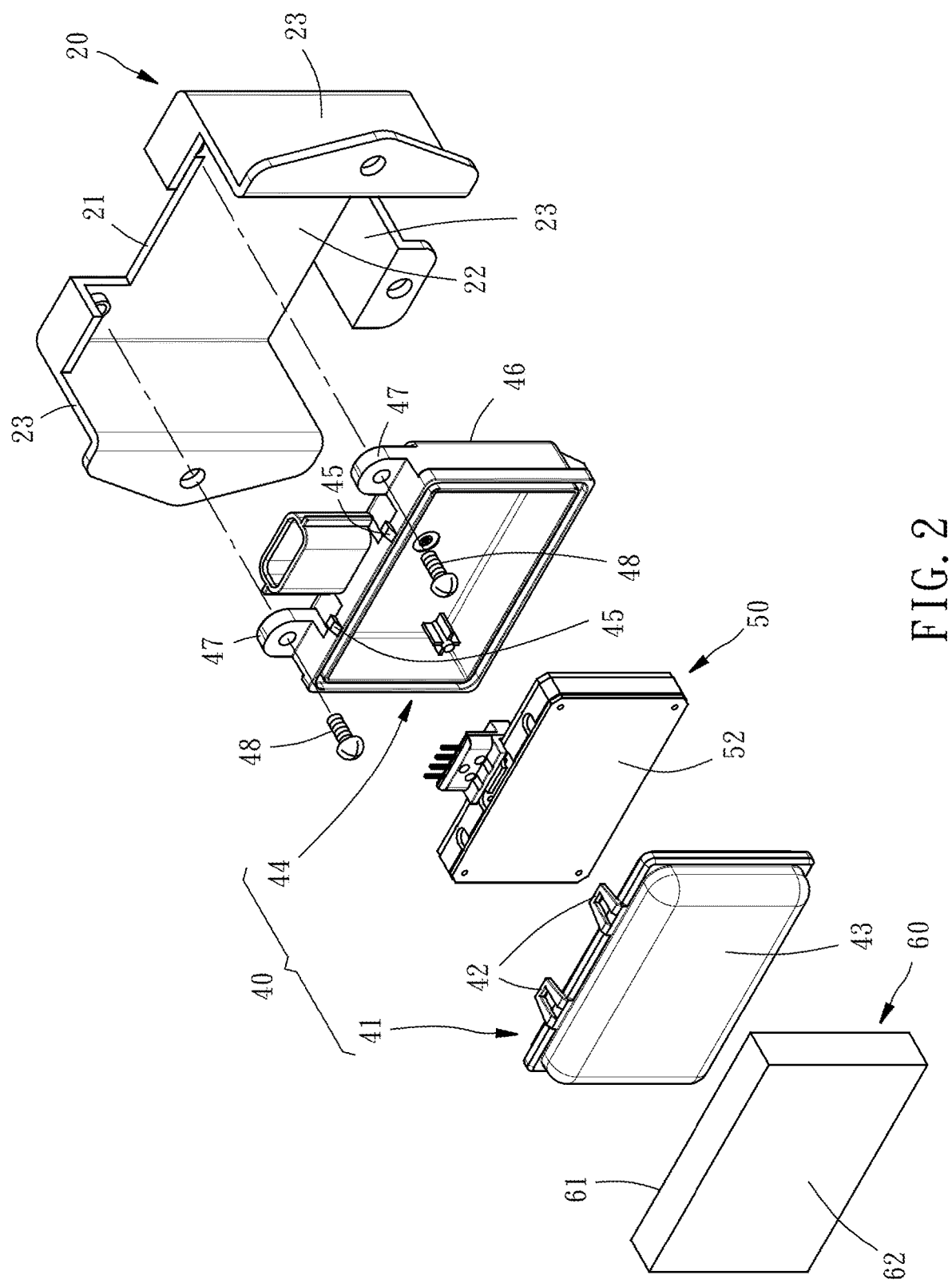
FIG. 2 is an exploded view of the vehicular radar device according to the first embodiment of the present disclosure.

Referring to FIG. 1 and FIG. 2, a vehicular radar device 10 provided in the first embodiment of the present disclosure comprises a chassis 20, a radar module 30 and a dustproofing element 60.

Figure 3:
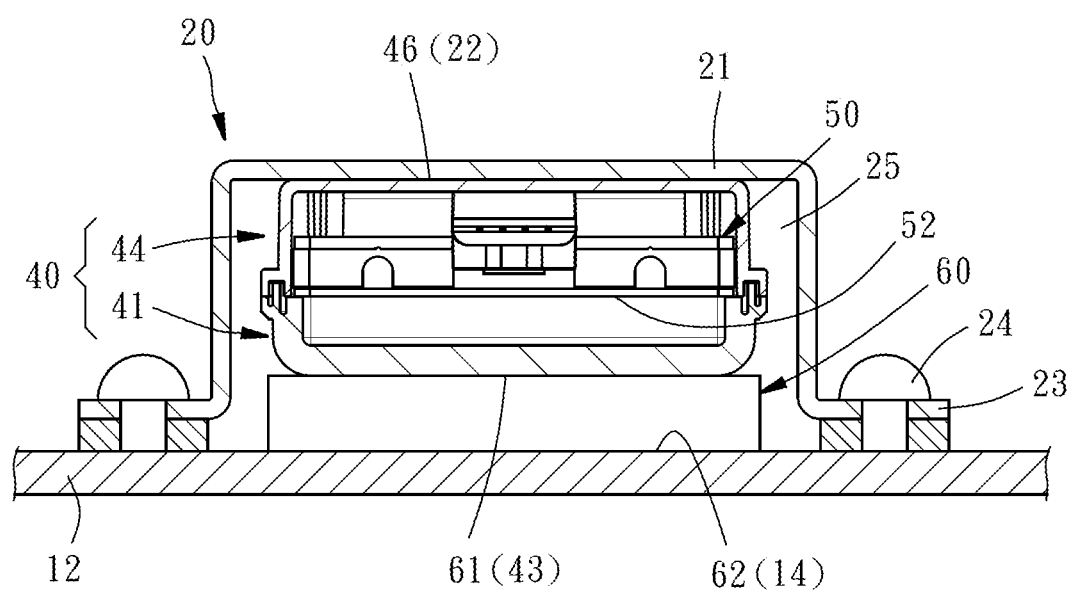
FIG. 3 is a partial cross-sectional view of the vehicular radar device mounted on a bumper according to the first embodiment of the present disclosure.

As shown in FIG. 2 and FIG. 3, the chassis 20 has a covering plate 21 and a plurality of wing plates 23. The covering plate 21 has a support surface 22. The support surface 22 of the covering plate 21 faces an inner wall surface 14 of a bumper 12. The wing plates 23 are integrally, vertically connected to the outer edge of the covering plate 21. The wing plates 23 are fixed to the inner wall surface 14 of the bumper 12 by fixing components 24, such as rivets, dowels, raised dots and fasteners. Alternatively, the bumper the inner wall surface 14 is integrally formed with positioning posts, raised dots, fasteners or positioning holes to facilitate the fixing function of the fixing components 24; hence, a receiving space 25 for receiving the radar module 30 is formed between the covering plate 21 of the chassis 20 and the bumper 12.

The radar module 30 has a casing 40 made of a non-metallic material (for example, plastic). The casing 40 has a first lateral cover 41 and a second lateral cover 44. The outer edge of the first lateral cover 41 has two first engaging portions 42. The outer edge of the second lateral cover 44 has two second engaging portions 45. The first and second lateral covers 41, 44 are coupled together by the engagement of the first and second engaging portions 42, 45 (as shown in FIG. 1.) As shown in FIG. 2 and FIG. 3, the first lateral cover 41 of the casing 40 has a first outer wall surface 43, and the second lateral cover 44 of the casing 40 has a second outer wall surface 46. As shown in FIG. 3, the first outer wall surface 43 faces the inner wall surface 14 of the bumper 12, whereas the second outer wall surface 46 abuts against the support surface 22 of the covering plate 21 of the chassis 20. As shown in FIG. 1 and FIG. 2, the outer edge of the second lateral cover 44 of the casing 40 further has lugs 47, and thus fixing components 48, such as screws, penetrate the lugs 47 to therefore fasten together the second lateral cover 44 of the casing 40 and the covering plate 21 of the chassis 20.

As shown in FIG. 2 and FIG. 3, the radar module 30 further has a radar sensor 50. The radar sensor 50 is disposed in the casing 40 and has an emission surface 52. The emission surface 52 of the radar sensor 50 faces the first outer wall surface 43 of the casing 40 such that a sensing signal generated from the radar sensor 50 penetrates the first outer wall surface 43 of the casing 40 and the bumper 12 consecutively in order to be sent. When confronted by an obstacle (for example, a vehicle in the front), the radar sensor 50 generates a reflection signal. The reflection signal penetrates the bumper 12 and the first outer wall surface 43 of the casing 40 consecutively before being received by the radar sensor 50; afterward, the radar module 30 determines the location, angle, speed and distance of the obstacle according to the reflection signal received.

The dustproofing element 60 is a non-metallic dustproofing element 60 and is made of a material, such as polyurethane, silicone, foam, epoxy and thermoplastic elastomer (TPE). As shown in FIG. 2 and FIG. 3, the dustproofing element 60 has a first dustproofing surface 61 and a second dustproofing surface 62. The first dustproofing surface 61 of the dustproofing element 60 attaches to the first outer wall surface 43 of the casing 40 of the radar module 30 by a foam tape. The second dustproofing surface 62 of the dustproofing element 60 attaches to the inner wall surface 14 of the bumper 12 by a foam tape. In this embodiment, the dustproofing element 60 is a solid such that the first dustproofing surface 61 of the dustproofing element 60 covers the first outer wall surface 43 of the casing 40 of the radar module 30 completely.

Figure 4:
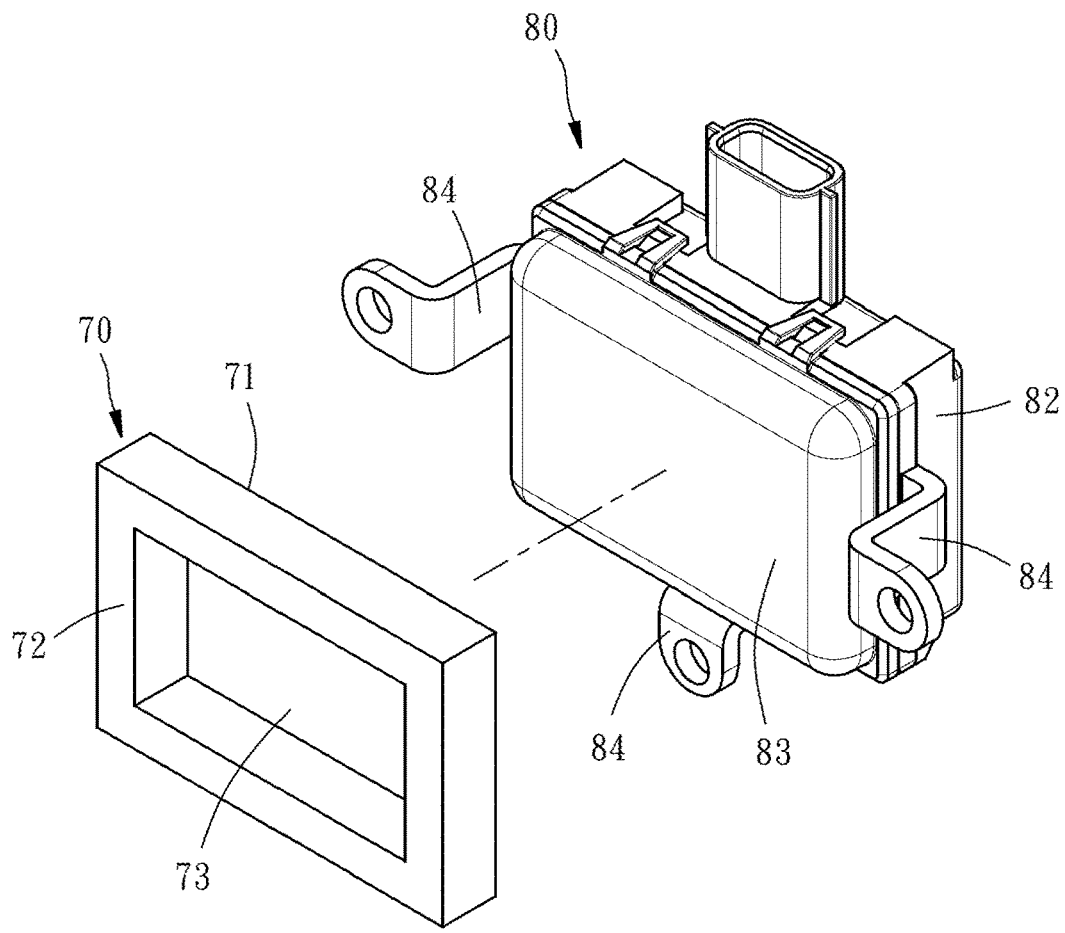
FIG. 4 is an exploded view of the vehicular radar device according to the second embodiment of the present disclosure.
Figure 5:
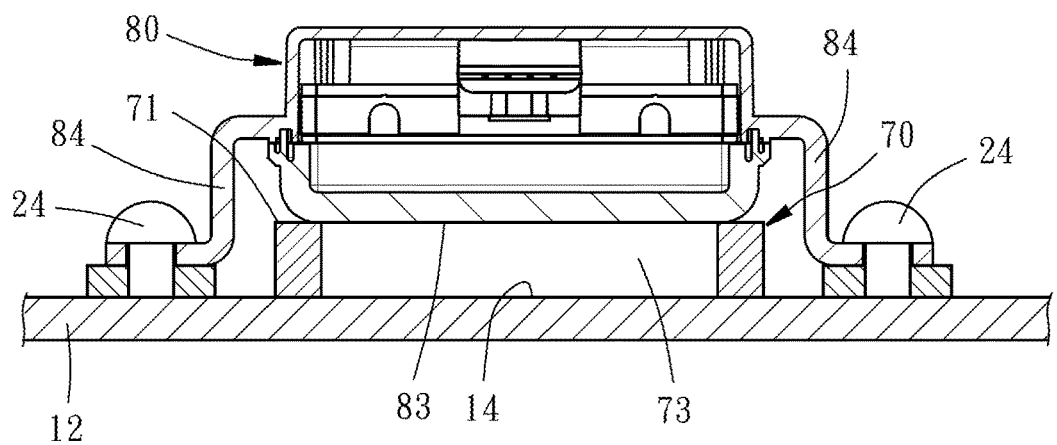
FIG. 5 is a partial cross-sectional view of the vehicular radar device mounted on a bumper according to the second embodiment of the present disclosure.

In the second embodiment of the present disclosure, a dustproofing element 70 is structurally different from its aforesaid counterpart. As shown in FIG. 4 and FIG. 5, the dustproofing element 70 has a hollowed-out chamber 73. The hollowed-out chamber 73 penetrates first and second dustproofing surfaces 71, 72 and is hermetically sealed by the inner wall surface 14 of the bumper 12 and a first outer wall surface 83 of a casing 80. The first dustproofing surface 71 of the dustproofing element 70 surrounds the edge of the first outer wall surface 83 of the casing 80; hence, a portion of the first outer wall surface 83 of the casing 80 is not covered by the first dustproofing surface 71 of the dustproofing element 70, so as to enhance the penetration capability of the sensing signal by the hollowed-out chamber 73. The second embodiment of the present disclosure dispenses with the chassis 20 by fixing the casing 80 of the radar module 30 to the inner wall surface 14 of the bumper 12 directly. As shown in FIG. 4 and FIG. 5, the outer edge of a second lateral cover 82 of the casing 80 integrally extends to form a plurality of wing portions 84. The wing portions 84 are fixed to the inner wall surface 14 of the bumper 12 by the fixing components 24, such as rivets, raised dots, fasteners and dowels, such that the dustproofing element 70 is held between the inner wall surface 14 of the bumper 12 and the first outer wall surface 83 of the casing 80 or between the inner wall surface 14 of the bumper 12 and inner surfaces of the wing portions 84.

The first and second embodiments of the present disclosure are interchangeable in terms of structural features, as needed. For instance, the dustproofing element 60 goes with the casing 80, or the dustproofing element 70 goes with the chassis 20 and the casing 80, to render the radar module 30 highly dustproof, whichever occurs.

Figure 6:
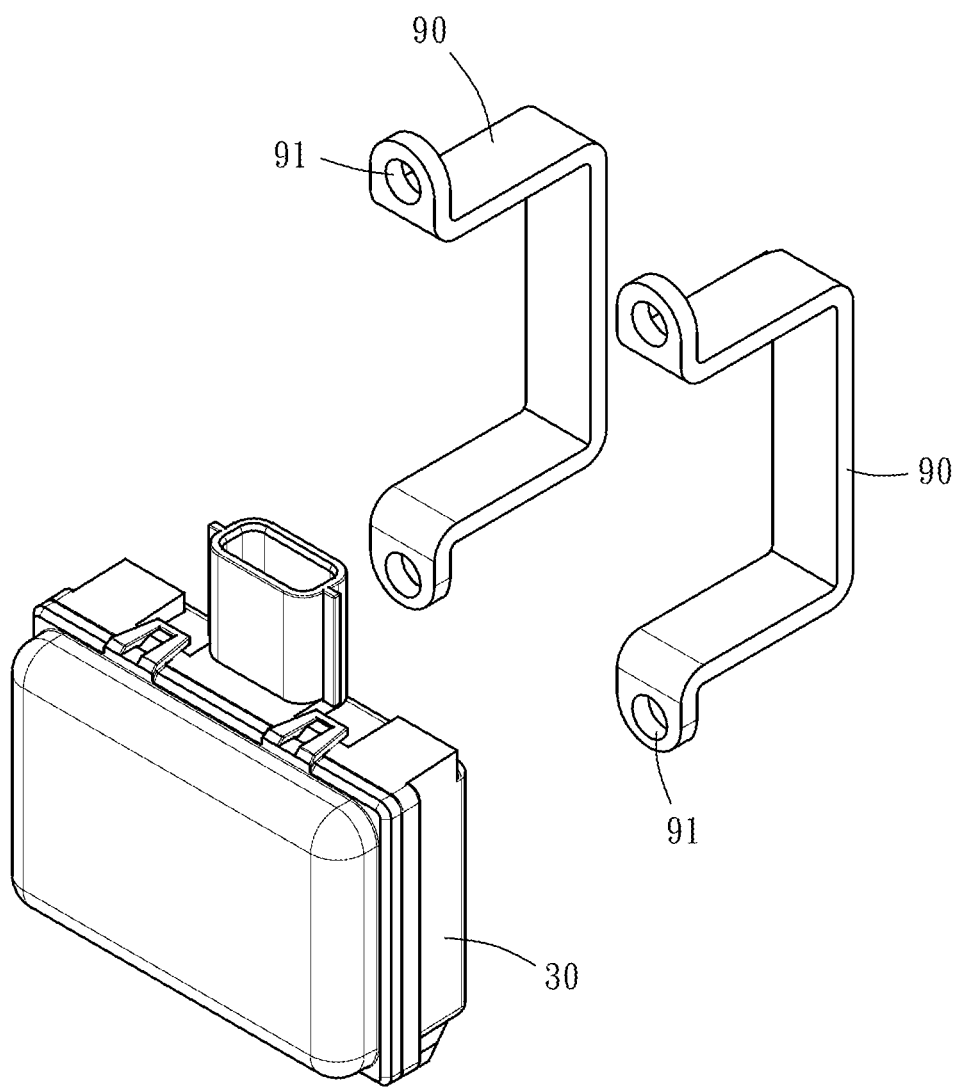
FIG. 6 is an exploded view of the vehicular radar device according to the third embodiment of the present disclosure.

According to the present disclosure, the way of fixing the radar module 30 and the bumper in place is not limited to the first and second embodiments but may be easier as shown in FIG. 6. Referring to FIG. 6, in the third embodiment of the present disclosure, the vehicular radar device comprises at least one fixing element 90 with two ends each having a coupling hole 91. The coupling holes 91 are penetrable by the fixing components 24, respectively, to achieve fixation. The radar module 30 is coupledly fixed to the inner wall surface of the bumper by the two fixing elements 90. Similarly, the dustproofing element is clampedly disposed between the radar module and the inner wall of the bumper or annularly adhered to the periphery of the radar module 30. Furthermore, the inner wall surface of the bumper is integrally formed with positioning posts, raised dots or positioning holes to facilitate the coupling and fixing function of the fixing elements 90.

Therefore, the vehicular radar device 10 of the present disclosure is advantageous in that the dustproofing elements 60, 70 attach to and thus cover the first outer wall surfaces 43, 83 of the casings 40, 80 of the radar module 30 completely or partially such that ambient dust is effectively prevented from attaching to the first outer wall surfaces. Hence, a sensing signal generated from and received by the radar sensor 50 is not subjected to excessive interference while penetrating the first outer wall surfaces 43, 83 of the casings 40, 80, so as to enhance sensing sensitivity of the radar sensor 50 and extend the service life of the radar sensor 50.

What is claimed is:

1. A vehicular radar device for use with a bumper, comprising:
    a radar module having a casing and a radar sensor, the casing having a first outer wall surface and a second outer wall surface opposing the first outer wall surface, wherein the first outer wall surface of the casing faces an inner wall surface of the bumper, with the radar sensor disposed in the casing and having an emission surface, the emission surface facing the first outer wall surface of the casing; and
    a dustproofing element having a first dustproofing surface and a second dustproofing surface, the first dustproofing surface attaching to the first outer wall surface of the casing of the radar module, and the second dustproofing surface attaching to the inner wall surface of the bumper.

2. The vehicular radar device of claim 1, wherein the dustproofing element is a solid, and the first dustproofing surface of the dustproofing element covers the first outer wall surface of the casing.

3. The vehicular radar device of claim 1, wherein the dustproofing element has a hollowed-out chamber penetrating the first and second dustproofing surfaces and hermetically sealed by the inner wall surface of the bumper and the first outer wall surface of the casing, and the first dustproofing surface of the dustproofing element surrounds an edge of the first outer wall surface of the casing.

4. The vehicular radar device of claim 2, wherein the dustproofing element is a non-metallic dustproofing and is made of a material comprising one selected from the group consisting of polyurethane, silicone, foam, epoxy and thermoplastic elastomer (TPE).

5. The vehicular radar device of claim 3, wherein the dustproofing element is a non-metallic dustproofing and is made of a material comprising one selected from the group consisting of polyurethane, silicone, foam, epoxy and thermoplastic elastomer (TPE).

6. The vehicular radar device of claim 1, wherein the casing is fixed to a chassis, and the chassis is fixed to the inner wall surface of the bumper.

7. The vehicular radar device of claim 6, wherein the casing has a first lateral cover and a second lateral cover, the first and second lateral covers being demountably coupled together, the first lateral cover having the first outer wall surface, with the second lateral cover fixed to the chassis and having the second outer wall surface.

8. The vehicular radar device of claim 7, wherein the chassis has a covering plate and a plurality of wing plates, the covering plate being fixed to the second lateral cover of the casing of the radar module and having a support surface, the support surface abutting against the second outer wall surface of the casing of the radar module, the wing plates being integrally connected to an outer edge of the covering plate and fixed to the inner wall surface of the bumper.

9. The vehicular radar device of claim 8, wherein the wing plates are fixed to the inner wall surface of the bumper by rivets, dowels, raised dots and fasteners.

10. The vehicular radar device of claim 2, wherein the casing is fixed to the inner wall surface of the bumper.

11. The vehicular radar device of claim 10, wherein the casing has a first lateral cover and a second lateral cover, the first and second lateral covers being demountably coupled together, the first lateral cover having the first outer wall surface, the second lateral cover having the second outer wall surface, with a plurality of wing portions disposed on an outer edge of the second lateral cover and fixed to the inner wall surface of the bumper.

12. The vehicular radar device of claim 11, wherein the wing portions are fixed to the inner wall surface of the bumper by rivets, dowels, raised dots and fasteners.

13. The vehicular radar device of claim 3, wherein the casing is fixed to the inner wall surface of the bumper.

14. The vehicular radar device of claim 13, wherein the casing has a first lateral cover and a second lateral cover, the first and second lateral covers being demountably coupled together, the first lateral cover having the first outer wall surface, the second lateral cover having the second outer wall surface, with a plurality of wing portions disposed on an outer edge of the second lateral cover and fixed to the inner wall surface of the bumper.

15. The vehicular radar device of claim 14, wherein the wing portions are fixed to the inner wall surface of the bumper by rivets, dowels, raised dots and fasteners.

16. The vehicular radar device of claim 2, wherein the casing is fixed to the inner wall surface of the bumper by fixing elements.

17. The vehicular radar device of claim 16, wherein the fixing elements are fixed to the inner wall surface of the bumper by rivets, dowels, raised dots and fasteners.

18. The vehicular radar device of claim 3, wherein the casing is fixed to the inner wall surface of the bumper by fixing elements.

19. The vehicular radar device of claim 18, wherein the fixing elements are fixed to the inner wall surface of the bumper by rivets, dowels, raised dots and fasteners.

* * * * *